United States Patent [19]

Mercado

[11] Patent Number: 4,929,071

[45] Date of Patent: May 29, 1990

[54] LONG-FOCUS COLOR-CORRECTED PETZVAL-TYPE OPTICAL OBJECTIVE

[75] Inventor: Romeo I. Mercado, San Jose, Calif.

[73] Assignee: Lockheed Missiles & Space Company, Inc., Sunnyvale, Calif.

[21] Appl. No.: 811,848

[22] Filed: Dec. 20, 1985

[51] Int. Cl.$^5$ .............................................. G02B 9/00
[52] U.S. Cl. ..................................... 350/463; 350/412
[58] Field of Search ....................... 350/463, 464, 412

[56] References Cited

U.S. PATENT DOCUMENTS 4,178,075 12/1979 Rodgers ............................. 350/412

OTHER PUBLICATIONS

Mercado et al., Superachromatic Petzval Objectives, 10-19-1982, JOSA., vol. 72, p. 1725.

*Primary Examiner*—Paul M. Dziehzynski
*Attorney, Agent, or Firm*—John J. Morrissey

[57] ABSTRACT

A modified Petzval-type optical objective is provided, whose design form has a long focal length (i.e., 1000 mm) at a large relative aperture (i.e., f/2) over a field of view of 4.2° without vignetting, which is well-corrected for both monochromatic and chromatic aberrations, and which is color-corrected at four wavelengths over a spectral band extending from the visible to the near-infrared regions of the electromagnetic spectrum. The optical objective is made from only two different optical glasses. The design form can be scaled up or down from the 1000 mm focal length by using an appropriate scaling factor.

14 Claims, 3 Drawing Sheets

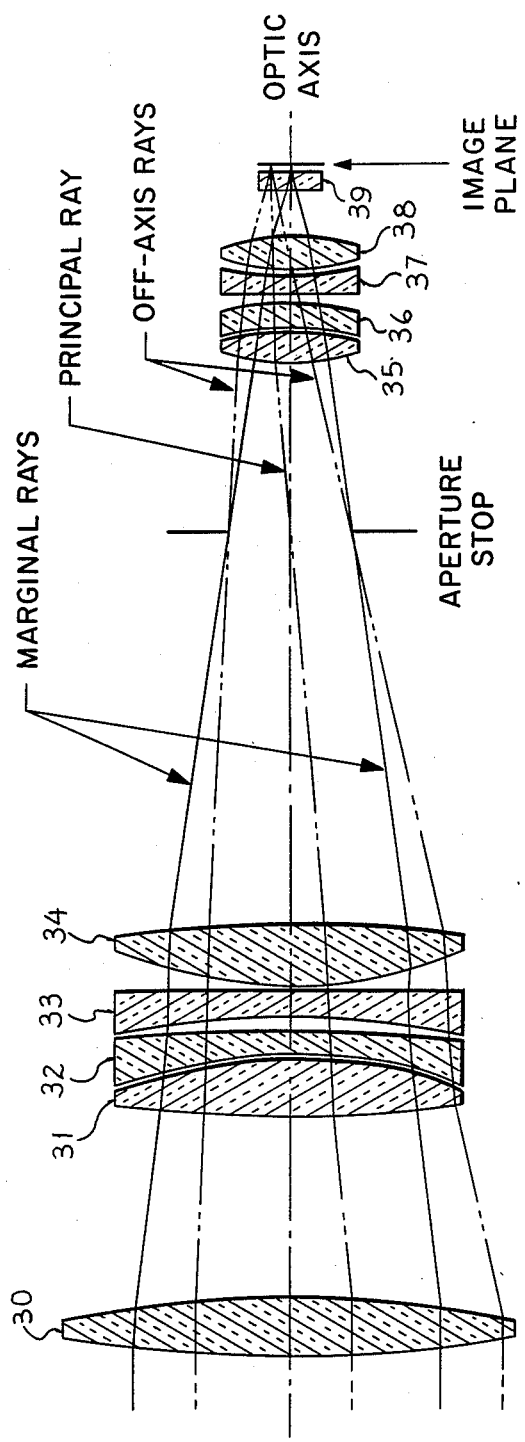

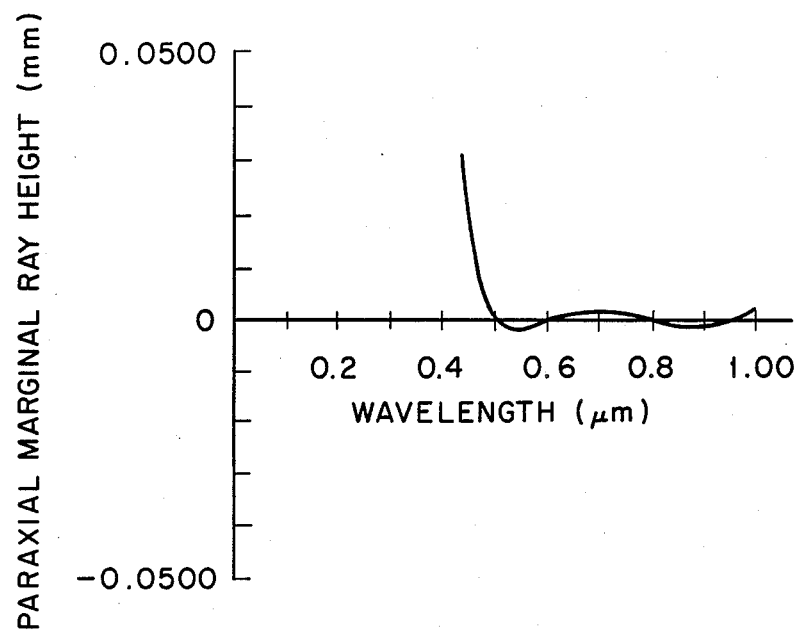
FIG_2
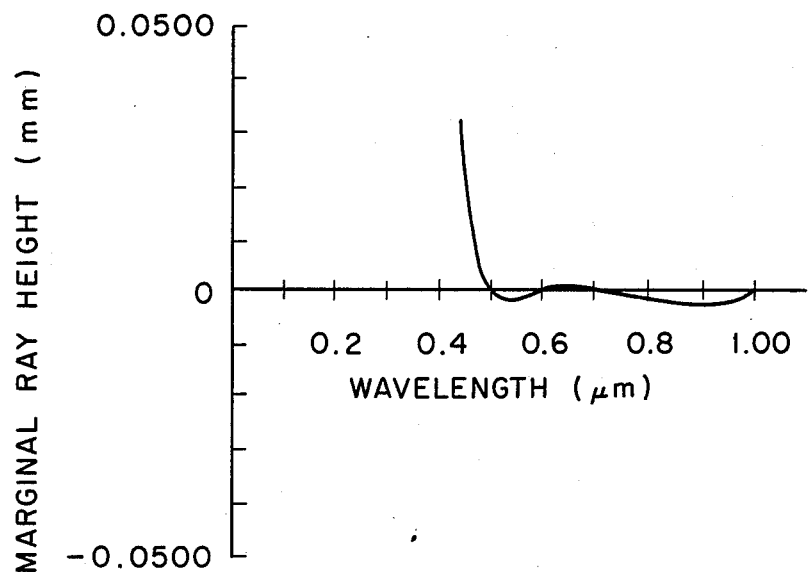
FIG_3

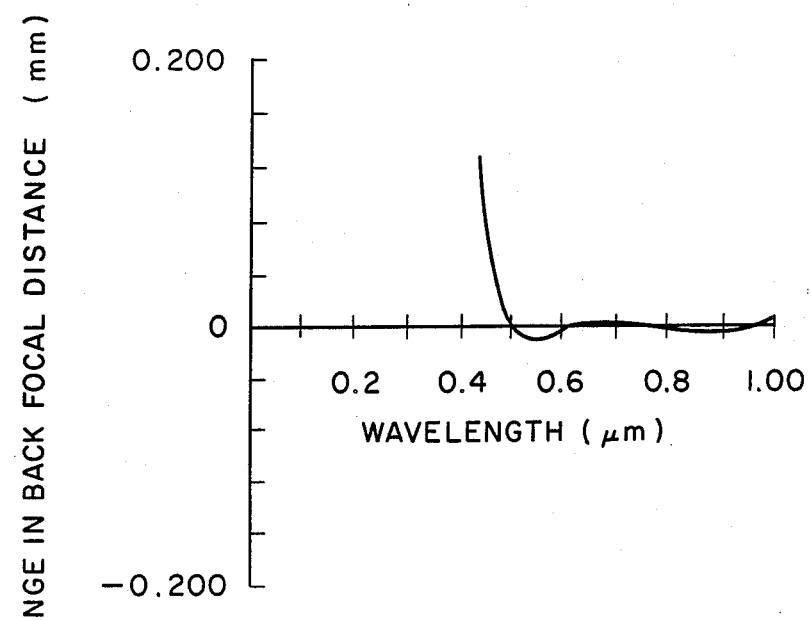
FIG_4
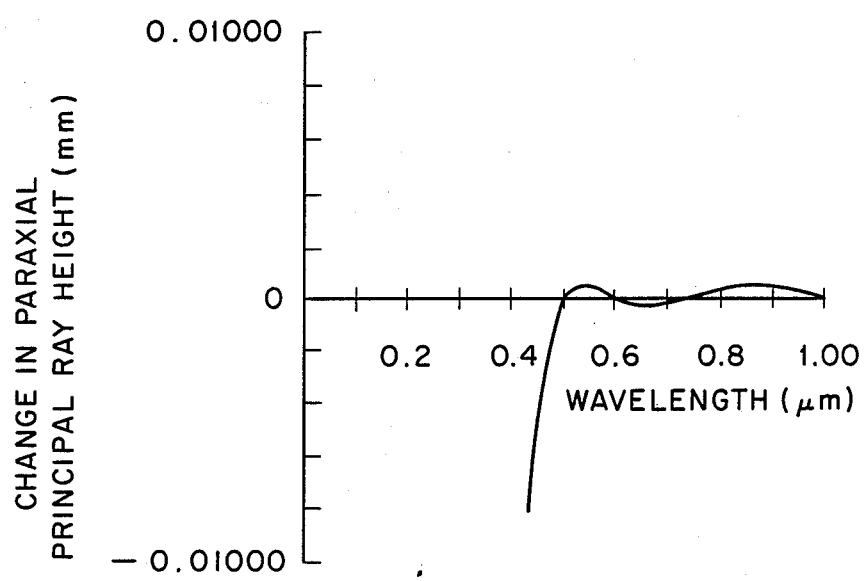
FIG_5

LONG-FOCUS COLOR-CORRECTED PETZVAL-TYPE OPTICAL OBJECTIVE

TECHNICAL FIELD

This invention relates generally to optical objectives, and more particularly to a well-corrected two-glass optical objective of a modified Petzval type having a large relative aperture, a long equivalent focal length and high resolution, which is color-corrected at four wavelengths over a spectral band extending from the visible to the near infrared regions of the electromagnetic spectrum.

BACKGROUND OF THE INVENTION

The designation "Petzval lend system" is generally applied to a lens system comprising two widely separated lens groups, each of which has a net positive dioptric power, and a negative lens element (or lens group) having a net negative dioptric power. The positive leng groups in combination provide good resolution at high aperture for narrow to moderately wide fields of view. The negative lens element (or lens group) functions as a field flattener. Often, each lens group of a Petzval lens system is a doublet. However, for a particular application, either one (or all) of the lens groups of a Petzval lens system could be a singlet, a triplet or a higher-number multiplet.

The spacing between the two positive lens groups of a Petzval lens system is large in comparison with the thicknesses of the individual lens elements comprising each lens group. Within a lens group, the individual lens elements could be cemented or air-spaced. It is usual for the negative lens element (or lens group) functioning as a field flattener to be positioned immediately in front of the image plane of the Petzval lens system to correct for field curvature. A Petzval lens system that includes a field flattener is often called a flat-field Petzval lens system.

In the prior art, Petzval lens system were typically used only in short-focus applications, e.g., in projectors for 16 mm and 8 mm motion-picture films. Also, Petzval lens systems of the prior art wer typically "achromats", i.e., they were color-corrected at only two wavelengths.

SUMMARY OF THE INVENTION

An object of the present invention is to provide a novel two-glass optical objective (i.e., an optical objective made of only two different kinds of optical glasses) of high resolution and long focal length, which is well-corrected for both monochromatic and chromatic abberrations as well as being color-corrected at four wavelengths in a spectral band extending from the visible to the near infrared regions of the electromagnetic spectrum.

A further object of the present invention is to provide a high-resolution optical objective of long focal length, which is well-corrected for both monochromatic and chromatic abberrations as well as being color-corrected at four wavelengths over a wide spectral band, and which is made of two (and only two) different commercially available optical glasses without requiring a fluorite or other type of crystal as one of the optical materials.

Design forms are provided for three specific embodiments of two-glass optical objectives according to the present invention, each of which has an equivalent focal length of 1000 millimeters at a relative aperature of f/2 over a field of view of 4.2° without vignetting. The design form for each embodiment comprises a different pair of optical glasses, and each design form can be scaled up or down from the 1000 mm focal length for the same relative aperture and field of view.

DESCRIPTION OF THE DRAWING

FIG. 1 is a profile drawing of an optical objective according to the present invention, whose design form is optimized for a 1000 mm focal length at a relative aperture of f/2 over a field of view of 4.2° without vignetting.

FIG. 2 is a plot of paraxial marginal ray height versus wavelength for the objective of FIG. 1.

FIG. 3 is a plot of marginal ray height versus wavelength for the objective of FIG. 1.

FIG. 4 is a plot of change in back focal distance versus wavelength for the objective of FIG. 1.

FIG. 5 is a plot of change in paraxial principal ray height versus wavelength for the objective of FIG. 1.

BEST MODE OF CARRYING OUT THE INVENTION

An optical objective according to the present invention is schematically illustrated in FIG. 1 for an equivalent focal length of 1000 mm at a relative aperture of f/2 over a field of view of 4.2° without vignetting. The objective shown in FIG. 1 has a design form that provides substantially diffraction-limited performance over a spectral band extending from the visible to the near-infrared regions of the electromagnetic spectrum, and is color-corrected at four wavelengths in that spectral band.

The design form for the objective shown in FIG. 1 can be scaled up or down from the 1000 mm focal length of different actual focal lengths for the same relative aperture and field of view depending upon the requirements of particular applications. In general, the aberrations of an optical system with fixed aperture ratio and field of view are scaled up or down in proportion of the system focal length. In applications that permit vignetting, the design form for the objective shown in FIG. 1 could readily be optimized to achieve color-correction at the same number of wavelengths over a wider field of view than 4.2°.

The objective shown in FIG. 1 is of a modified Petzval type, and comprises two lens groups of net positive dioptric power separated by an aperture stop and a negative lens element positioned adjacent the image plane of the objective. The first lens group comprises five lens elements, viz., two positive lens elements 30 and 31 made of Hoya FCD10 glass, two negative lens elements 32 and 33 made of Hoya LAC14 glass, and another positive lens element 34 made of Hoya FCD10 glass. The second lens group comprises four lens elements, viz., a positive lens element 35 made of Hoya FCD10 glass, two negative lens elements 36 and 37 made of Hoya LAC14 glass, and a positive lens element 38 made of Hoya FCD10 glass. A negative lens element 39, which is positioned in front of the image plane to function as a field flattener, is made of Hoya LAC14 glass. The designations "FCD10" and "LAC14" are catalog designations for particular types of optical glasses marketed by Hoya Corporation of Tokyo, Japan. The various lens elements are arranged along an optic axis so that each lens element is rotationally symmetric with respect to the optic axis.

The design parameters for the optical objective shown in FIG. 1 are referred to a base wavelength of $\lambda_0 = 0.58756$ micron (i.e., the yellow helium d line), and are specified in TABLE I as follows:

TABLE I

| Surface No. | Radius (mm) | Thickness (mm) | $N_d$ | $V_d$ | Material |
|---|---|---|---|---|---|
| 1 | 1927.867 | 93.759 | 1.45650 | 90.77 | FCD10 |
| 2 | −1648.146 | 283.367 | | | Air |
| 3 | 2595.537 | 87.508 | 1.45650 | 90.77 | FCD10 |
| 4 | −846.041 | 2.937 | | | Air |
| 5 | −818.691 | 37.504 | 1.69680 | 55.46 | LAC14 |
| 6 | −8142.226 | 25.522 | | | Air |
| 7 | −1209.561 | 37.504 | 1.69680 | 55.46 | LAC14 |
| 8 | 8985.894 | 13.345 | | | Air |
| 9 | 811.630 | 87.508 | 1.45650 | 90.77 | FCD10 |
| 10 | −2010.034 | 616.910 | | | Air |
| 11 | Aperture stop | 261.426 | | | Air |
| 12 | 286.573 | 50.005 | 1.45650 | 90.77 | FCD10 |
| 13 | −513.710 | 15.006 | | | Air |
| 14 | −324.409 | 25.002 | 1.69680 | 55.46 | LAC14 |
| 15 | −706.264 | 19.622 | | | Air |
| 16 | 3455.771 | 25.002 | 1.69680 | 55.46 | LAC14 |
| 17 | 603.169 | 12.772 | | | Air |
| 18 | 386.595 | 50.005 | 1.45650 | 90.77 | FCD10 |
| 19 | −303.879 | 71.919 | | | Air |
| 20 | −243.729 | 25.002 | 1.69680 | 55.46 | LAC14 |
| 21 | 388.414 | 13.633 | | | Air |
| 22 | Image plane | | | | | where the surfaces of the lens elements, and also the positions of the aperture stop and the image plane, are numbered consecutively from left to right in accordance with conventional optical design practice.

The radius listed in the second column of the table for each surface is the radius of curvature of the particular surface expressed in millimeters. In accordance with convention, the radius of curvature of an optical surface is said to be positive if the center of curvature of the surface lies to the right of the surface, and negative if the center of curvature of the surface lies to the left of the surface. The thickness listed in the third column of the table for each surface is the thickness of the lens element, or of the spacing, bounded on the left by the particular surface. Thickness is expressed in millimeters, and is measured along the optic axis of the objective. The heading $N_d$ in the fourth column of the table indicate the refractive index for the material of the lens element bounded on the left by the indicated surface, where the value of the refractive index is given for the yellow helium d line. The heading $V_d$ in the fifth column of the table indicates the Abbe number for the particular lens element material at the same base wavelength. The "material" listed in the sixth column of the table for each surface refers to the type of optical material (i.e., the type of glass) used for making the lens element bounded on the left by the indicated surface.

The index of refraction $N_d$ for each lens element is an experimentally determined value as determined by the glass manufacturer, Hoya Corporation, for the wavelength $\lambda_0 = 0.58756$ micron. The Abbe number $V_d$ for each lens element is the ratio $(N_d - 1)/(N_F - N_C)$, where $N_F$ is the refractive index of the particular glass at the hydrogen F line (i.e., at 0.48613 micron) and $N_C$ is the refractive index of the particular glass at the hydrogen C line (i.e., at 0.65627 micron). The values of $N_d$ and $V_d$ listed in the table for a particular surface refer to the lens element shown to the right of the indicated surface in FIG. 1. The optical material from which each lens element is made is technically specified in terms of the index of refraction $N_d$ and the Abbe number $V_d$. However, as a practical matter, optical designers ordinarily specify an optical glass in terms of the manufacturer's name and catalog number.

A measure of the extent to which secondary and high-order spectra have been minimized for the optical objective illustrated in FIG. 1 is indicated by the plot of paraxial marginal ray height versus wavelength shown in FIG. 2. The value of the paraxial marginal ray height at a given focal surface for an imaging system at any particular wavelength is a measure of the extent of the geometrical image blur (i.e., the image blur without consideration of diffraction effects) inherent in the system at that particular wavelength. The variation of paraxial marginal ray height with wavelength at a given focal surface provides an indication of the extent to which axial chromatic aberration is corrected in the system.

For the optical objective of the present invention, the curve in FIG. 2 illustrating the variation of paraxial marginal ray height with respect to wavelength indicates that axial chromatic aberration is precisely corrected (i.e., color correction is achieved) at four wavelengths (as indicated by the four crossings of the wavelength axis by the curve) in a wavelength band extending from the visible to the near infrared regions of the electromagnetic spectrum. Furthermore, the curve in FIG. 2 is close to the wavelength axis (i.e., the paraxial marginal ray height is quite small) for all wavelengths between those for which color correction is achieved.

In FIG. 3, the marginal ray height versus wavelength is plotted for the optical objective illustrated in FIG. 1. A marginal ray passing through an optical system is a ray that orginates at an axial object point and grazes the periphery of the entrance pupil of the system so as to define the maximum cone of rays from the object point that can be accepted by the system. For an infinitely distant object, the marginal ray is parallel to the optic axis and has a ray height from the optic axis equal to the radius of the entrance pupil of the system.

The parameters (i.e., ray heights and slopes) of a marginal ray passing through an optical system can be calculated by application of Snell's Law. As with a paraxial marginal ray, so also a marginal ray intersects a focal surface of the system at a point that generally is spatially separated from the point of intersection of the optic axis with the focal surface. The lateral separation between the optic axis of the system and the point of intersection of the marginal ray with a surface is designates as the marginal ray "height" for that surface. The value of the marginal ray height at a given focal surface changes with wavelength due to spherical aberration and the chromatic variation of spherical aberration (i.e., spherochromatism) inherent in the system. The value of the marginal ray height for a particular wavelength is a measure of the extent of geometric image blur at the particular wavelength, taking spherical aberration into consideration. As indicated by the curve of FIG. 3, th optical objective of the present invention is extremely well-corrected for spherical aberration in addition to being color-corrected at four wavelengths.

The distance from the last lens element to the image plane of an optical system (e.g., the distance from surface No. 21 to surface No. 22 of the optical objective illustrated in FIG. 1) is called the back focal distance of the system. In FIG. 4, the change in back focal distance is plotted as a function of wavelength for the optical objective shown in FIG. 1. For a color-correction imaging system, paraxial marginal rays at the wavelengths for which color correction has been achieved are brought to a common focus. The back focal distance for those wavelengths for which color correction has been achieved can be considered as a "baseline± back focal distance. For the wavelengths at which color correction has not been achieved (i.e., for the wavelengths between the crossing points on the horizontal axis for the curve of FIG. 2), the paraxial marginal rays are focussed at other focal surfaces whose positions along the optic axis of the imaging system are dependent upon wavelength. The variation with wavelength of the back focal distance with respect to the "baseline" back focal distance provides an indication of the chromatic variation in focal position along the optic axis of the system, and hence is commonly called "longitudinal" or "axial" chromatic aberration. The curve of FIG. 4 also provides a measure of the axial chromatic aberration, and indicates that the optical objective shown in FIG. 1 is very well-corrected for axial chromatic aberration.

In FIG. 5, the change in paraxial principal ray height is plotted as a function of wavelength for the optical objective shown in FIG. 1. The value of the paraxial principal ray height at a given focal surface for an imaging system changes with wavelength. For a color-corrected imaging system, the paraxial principal ray height at the focal surface for which color-correction has been achieved can be considered as a "baseline" paraxial principal ray height. In FIG. 5, the variation with wavelength of the paraxial principal ray height with respect to the "baseline" paraxial principal ray height provides a measure of the chromatic variation of image height, which is commonly called the chromatic difference of magnifcation, or lateral chromatic aberration, or "lateral color". The optical objective shown in FIG 1 is thus seen to be very well-corrected for lateral chromatic aberration.

The design parameters tabulated above in TABLE I (which pertain specifically to an optical objective having an equivalent focal length of 1000 mm, a relative aperture of f/2 and a field of view of 4.2° withough vignetting) can be utilized in designing homologous optical objectives having other focal lengths by multiplying th e tabulated values for the surface radii and for the axial thicknesses of the lens elements and air spaces by an appropriate scaling factor. Thus, for a homologous optical objective having a focal length of 100 mm, the scaling factor would be 0.1 (i.e., 100 mm/1000 mm=0.1); and for a homologous optical objective having a focal length of 1200 mm, the scaling factor would be 1.2 (i.e., 1200 mm/1000 mm=1.2).

It has been found that a modified Petzval-type optical objective generally as illustrated in FIG. 1 can be obtaied by replacing the Hoya FCD10 glass by Corning-France 486817 glass, and by replacing the Hoys LAC14 glass by Corning-France 697554 glass, and by re-optimizing the optical design performance by adjusting the radii of curvature and the axial thicknesses and air spaces to values such as those specified in TABLE II, as follows:

TABLE II

| Surface No. | Radius (mm) | Thickness (mm) | $N_d$ | $V_d$ | Material |
|---|---|---|---|---|---|
| 1 | 1930.696 | 93.727 | 1.48605 | 81.70 | 486817 |
| 2 | −1985.752 | 157.321 | | | Air |
| 3 | 2169.018 | 87.478 | 1.48605 | 81.70 | 486817 |
| 4 | −945.731 | 3.537 | | | Air |
| 5 | −917.788 | 24.994 | 1.69700 | 55.40 | 697554 |
| 6 | 3781.912 | 44.989 | | | Air |
| 7 | −1209.273 | 24.994 | 1.69700 | 55.40 | 697554 |
| 8 | 173343.000 | 1.499 | | | Air |
| 9 | 914.125 | 87.478 | 1.48605 | 81.70 | 486817 |
| 10 | −2319.675 | 778.803 | | | Air |
| 11 | Aperture stop | 78.869 | | | Air |
| 12 | 396.283 | 42.763 | 1.48605 | 81.70 | 486817 |
| 13 | −523.510 | 9.781 | | | Air |
| 14 | −444.264 | 19.995 | 1.69700 | 55.40 | 697554 |
| 15 | −4227.905 | 30.275 | | | Air |
| 16 | −3374.885 | 19.995 | 1.69700 | 55.40 | 697554 |
| 17 | 812.577 | 9.668 | | | Air |
| 18 | 334.555 | 42.764 | 1.48605 | 81.70 | 486817 |
| 19 | −699.814 | 225.937 | | | Air |
| 20 | −249.564 | 12.544 | 1.69700 | 55.40 | 697554 |
| 21 | 2177.730 | 44.148 | | | |
| 22 | Image plane | | | | | where the surfaces of the lens elements and the other optically significant surfaces are numbered consecutively from left to right in accordance with conventional optical design practice. The designations "486817" and "697554" are international six-figure codes, where the first three digits represent the first three decimal numbers of $N_d$ and the last three digits represent the whole number and the first decimal number of $V_d$. The catalog designations for these particular types of optical glasses marketed by Corning-France of Avon, France are PFC A86-82 for the "486817" glass and BCS C97-55 for the "697554" glass.

The design parameters in TABLE II (which pertain specifically to an optical objective having an equivalent focal length of 1000 mm, a relative aperture of f/2, and a field of view of 4.2° without vignetting) can also be used to design homologous optical objectives having other focal lengths by mulitplying the tabulated values for the surface radii and for the axial thicknesses and air spaces by an appropriate scaling factor for the particular focal length. Plots of paraxial marginal ray height versus wavelength, marginal ray height versus wavelength, change in back focal distance versus wavelength, and change in paraxial principal ray height versus wavelength for the optical objective whose design parameters are tabulated in TABLE II result in curves that are remarkably similar to those shown in FIGS. 2, 3, 4, and 5, respectively.

It has also been found that a modified Petzval-type optical objective generally as illustrated in FIG. 1 can be obtained by replacing the Hoya LAC14 glass by Corning-France 697554 glass, and by re-optimizing the optical design performance by adjusting the radii of curvature and the axial thicknesses and air spaces to values such as those specified in TABLE III, as follows:

TABLE III

| Surface No. | Radius (mm) | Thickness (mm) | $N_d$ | $V_d$ | Material |
|---|---|---|---|---|---|
| 1 | 1944.442 | 93.749 | 1.45650 | 90.77 | FCD10 |
| 2 | −1644.700 | 283.323 | | | Air |
| 3 | 2621.252 | 87.499 | 1.45650 | 90.77 | FCD10 |
| 4 | −842.841 | 2.937 | | | Air |
| 5 | −815.785 | 37.499 | 1.69700 | 55.40 | 697554 |
| 6 | −7785.324 | 25.508 | | | Air |
| 7 | −1200.218 | 37.499 | 1.69700 | 55.40 | 697554 |
| 8 | 9621.081 | 13.108 | | | Air |
| 9 | 814.132 | 87.499 | 1.45650 | 90.77 | FCD10 |

TABLE III-continued

| Surface No. | Radius (mm) | Thickness (mm) | $N_d$ | $V_d$ | Material |
|---|---|---|---|---|---|
| 10 | −1982.644 | 615.906 | | | Air |
| 11 | Aperture stop | 261.114 | | | Air |
| 12 | 290.575 | 49.999 | 1.45650 | 90.77 | FCD10 |
| 13 | −509.072 | 15.004 | | | Air |
| 14 | −323.019 | 25.000 | 1.69700 | 55.40 | 697554 |
| 15 | −700.858 | 19.621 | | | Air |
| 16 | 3240.492 | 25.000 | 1.69700 | 55.40 | 697554 |
| 17 | 624.813 | 12.770 | | | Air |
| 18 | 391.217 | 49.999 | 1.45650 | 90.77 | FCD10 |
| 19 | −305.380 | 71.391 | | | Air |
| 20 | −246.544 | 25.000 | 1.69700 | 55.40 | 697554 |
| 21 | 380.407 | 14.886 | | | Air |
| 22 | Image plane | | | | | where the surfaces of the lens elements and the other optically significant surfaces ar numbered consecutively from left to right in accordance with conventional optical design practice.

The design parameters in TABLE III (which likewise pertain specifically to an optical objective having an equivalent focal length of 1000 mm, a relative aperture of f/2, and a field of view of 4.2° without vignetting) can also be used to design homologous optical objectives having other focal lengths. To obtain an optical objective having a particular focal length, the tabulated values for the surface radii and for the axial thicknesses and air spaces given in TABLE III would be multiplied by a corresponding scaling factor. Plots of paraxial marginal ray height versus wavelength, marginal ray height versus wavelength, change in back focal distance versus wavelength, and change in paraxial principal ray height versus wavelength for the optical objective whose design parameters are tabulated in TABLE III result in curves that are remarkably similar to those shown in FIGS. 2, 3, 4 and 5, respectively.

This invention has been described above in terms of particular embodiments, which are optimized for a particular focal length, a particular aperture ratio, and a particular field of view. Practitioners skilled in the art of optical design, having perused the foregoing description, could re-optimize the optical design performance by adjusting the design parameters presented above to obtain other embodiments that would be within the scope of the invention. Therefore, the embodiments discussed herein are merely descriptive of the invention, which is more generally defined by the following claims and their equivalents.

I claim:

1. A optical objective of net positive dioptric power, said objective having an image plane at which four discrete wavelength come to a common focus, said optical objective comprising:
   (a) a first lens group consisting of five lens elements,
   (b) a second lens group consisting of four lens elements, and
   (c) a field flattener consisting of one lens element,
all of said lens elements being disposed along an optic axis, each of said lens elements being rotationally symmetric with respect to said optic axis, said second group of lens elements being separated from said first group of lens elements along said optic axis by an aperture stop, said field flattener being located adjacent said image plane, said lens elements being made from only two different optical glasses, at least one of said lens elements being made from a first one of said optical glasses, at least one other of said lens elements being made from a second one of said optical glasses.

2. The optical objective of claim 1 wherein said first and second lens group are disposed on opposite sides of an aperture stop of said objective; and wherein said first lens group comprises in successive disposition along said optic axis:
   (a) a first positive lens element made of said first one of said optical glasses,
   (b) a second positive lens element made of said first one of said optical glasses,
   (c) a first negative lens element made of second one of said optical glasses,
   (d) a second negative lens element made of said second one of said optical glasses, and
   (e) a third positive lens element made of first one of said optical glasses;
wherein said second lens group comprises in successive disposition along said optic axis:
   (a) a fourth positive lens element made of said first one of said optical glasses,
   (b) a third negative lens element made of said second one of said optical glasses,
   (c) a fourth negative lens element made of said second one of said optically glasses, and
   (d) a fifth positive lens element made of said first one of said optical glasses; and
wherein said field flattener lens element is made of said second one of said optical glasses.

3. The optical objective of claim 2 wherein said first one of said optical glasses has an index of refraction of approximately 1.457 and an Abbe number of approximately 90.77 at a base wavelength of 0.58756 micron, and wherein said second one of said optical glasses has an index of refraction of approximately 1.697 and an Abbe number of approximately 55.46 at said base wavelength.

4. The optical objective of claim 3 wherein said first one of said optical glasses is Hoya FCD10 glass, and wherein said second one of said optical glasses is Hoya LAC14 glass.

5. The optical objective of claim 4 having a design form optimized for a focal length of 1000 millimeters at a relative aperture of f/2 and a field of view of 4.2° substantially as follows:

| Surface No. | Radius (mm) | Thickness (mm) | Material |
|---|---|---|---|
| 1 | 1927.867 | 93.759 | FCD10 |
| 2 | −1648.146 | 283.367 | Air |
| 3 | 2595.537 | 87.508 | FCD10 |
| 4 | −846.041 | 2.937 | Air |
| 5 | −818.691 | 37.504 | LAC14 |
| 6 | −8142.226 | 25.522 | Air |
| 7 | −1209.561 | 37.504 | LAC14 |
| 8 | 8985.894 | 13.345 | Air |
| 9 | 811.630 | 87.508 | FCD10 |
| 10 | −2010.034 | 616.910 | Air |
| 11 | Aperture stop | 261.426 | Air |
| 12 | 286.573 | 50.005 | FCD10 |
| 13 | −513.710 | 15.006 | Air |
| 14 | −324.409 | 25.002 | LAC14 |
| 15 | −706.264 | 19.622 | Air |
| 16 | 3455.771 | 25.002 | LAC14 |
| 17 | 603.169 | 12.772 | Air |
| 18 | 386.595 | 50.005 | FCD10 |
| 19 | −303.879 | 71.919 | Air |
| 20 | −243.729 | 25.002 | LAC14 |
| 21 | 388.414 | 13.633 | Air |
| 22 | Image plane | | |

6. The optical objective of claim 5 having an actual focal length different from 1000 millimeters, said lens elements having actual surface radii of curvature and actual axial thicknesses and spacings that are obtained from values tabulated in claim 5 by multiplying said values by a scaling factor, said scaling factor being the ratio of said actual focal length to said 1000 millimeter focal length for which said tabulated values are optimized.

7. The optical objective of claim 2 wherein said first one of said optical glasses has an index of refraction of approximately 1.486 and an Abbe number of approximately 81.70 at a base wavelength of 0.58756 micron, and wherein said second one of said optical glasses has an index of refraction of approximately 1.697 and an Abbe number of approximately 55.40 at said base wavelength.

8. The optical objective of claim 7 wherein said first one of said optical glasses is Corning-France 486817 glass, and wherein said second one of said optical glasses in Corning-France 697554 glass.

9. The optical objective of claim 8 having a design form optimized for a focal length of 1000 millimeters at a relative aperture of f/2 and a field of view of 4.2° substantially as follows:

| Surface No. | Radius (mm) | Thickness (mm) | Material |
| --- | --- | --- | --- |
| 1 | 1930.696 | 93.727 | 486817 |
| 2 | −1985.752 | 157.321 | Air |
| 3 | 2169.018 | 87.478 | 486817 |
| 4 | −945.731 | 3.537 | Air |
| 5 | −917.788 | 24.994 | 697554 |
| 6 | 3781.912 | 44.989 | Air |
| 7 | −1209.273 | 24.994 | 697554 |
| 8 | 173343.000 | 1.499 | Air |
| 9 | 914.125 | 87.478 | 486817 |
| 10 | −2319.675 | 778.803 | Air |
| 11 | Aperture stop | 78.869 | Air |
| 12 | 396.283 | 42.763 | 486817 |
| 13 | −523.510 | 9.781 | Air |
| 14 | −444.264 | 19.995 | 697554 |
| 15 | −4227.905 | 30.275 | Air |
| 16 | −3374.885 | 19.995 | 697554 |
| 17 | 812.577 | 9.668 | Air |
| 18 | 334.555 | 42.764 | 486817 |
| 19 | −699.814 | 225.937 | Air |
| 20 | −249.564 | 12.544 | 697554 |
| 21 | 2177.730 | 44.148 | Air |
| 22 | Image plane | | |

10. The optical objective of claim 9 having an actual focal length different from 1000 millimeters, said lens elements having actual surface radii of curvature and actual axial thicknesses and spacings that are obtained from values tabulated in claim 9 by multiplying said values by a scaling factor, said scaling factor being the ratio of said actual focal length to said 1000 millimeter focal length for which said tabulated values are optimized.

11. The optical objective of claim 2 wherein said first one of said optical glasses has an index of refraction of approximately 1.457 and an Abber number of approximately 90.77 at a base wavelength of 0.58756 micron, and wherein said second one of said optical glasses has an index of refraction of approximately 1.697 an an Abbe number of approximately 55.40 at said base wavelength.

12. The optical objective of claim 11 wherein said first one of said optical glasses in Hoya FCD10 glass, and wherein said second one of said optical glasses is Corning-France 697554 glass.

13. The optical objective of claim 12 having a design form optimized for a focal length of 1000 millimeters at a relative aperture of f/2 and a field of view of 4.2° substantially as follows:

| Surface No. | Radius (mm) | Thickness (mm) | Material |
| --- | --- | --- | --- |
| 1 | 1944.442 | 93.749 | FCD10 |
| 2 | −1644.700 | 283.323 | Air |
| 3 | 2621.252 | 87.499 | FCD10 |
| 4 | −842.841 | 2.937 | Air |
| 5 | −815.785 | 37.499 | 697554 |
| 6 | −7785.324 | 25.508 | Air |
| 7 | −1200.218 | 37.499 | 697554 |
| 8 | 9621.081 | 13.108 | Air |
| 9 | 814.132 | 87.499 | FCD10 |
| 10 | −1982.644 | 615.906 | Air |
| 11 | Aperture stop | 261.114 | Air |
| 12 | 290.575 | 49.999 | FCD10 |
| 13 | −509.072 | 15.004 | Air |
| 14 | −323.019 | 25.000 | 697554 |
| 15 | −700.858 | 19.621 | Air |
| 16 | 3240.492 | 25.000 | 697554 |
| 17 | 624.813 | 12.770 | Air |
| 18 | 391.217 | 49.999 | FCD10 |
| 19 | −305.380 | 71.391 | Air |
| 20 | −246.544 | 25.000 | 697554 |
| 21 | 380.407 | 14.886 | Air |
| 22 | Image plane | | |

14. The optical objective of claim 13 having an actual focal length different from 1000 millimeters, said lens elements having actual surface radii of curvature and acutal axial thicknesses and spacings that are obtained from values tabulated in claim 13 by multiplying said values by a scaling factor, said scaling factor being the ratio of said actual focal length to said 1000 millimeter focal length for which said tabulated values are optimized.

* * * * *